(12) United States Patent
Ojima et al.

(10) Patent No.: US 8,342,275 B2
(45) Date of Patent: Jan. 1, 2013

(54) FUEL CELL VEHICLE

(75) Inventors: Kuniaki Ojima, Saitama (JP);
Yoshikazu Murakami, Saitama (JP);
Dai Saitoh, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 468 days.

(21) Appl. No.: 12/120,016

(22) Filed: May 13, 2008

(65) Prior Publication Data

US 2008/0283313 A1    Nov. 20, 2008

(30) Foreign Application Priority Data

May 17, 2007    (JP) .................................. 2007-131876

(51) Int. Cl.
*B60K 1/00* (2006.01)
*B60W 10/00* (2006.01)
*B60W 20/00* (2006.01)
*B60W 10/24* (2006.01)

(52) U.S. Cl. ............... 180/65.31; 180/65.1; 180/65.265; 180/68.285; 180/65.29; 903/908; 903/944; 903/903

(58) Field of Classification Search ............... 180/65.31, 180/65.1, 65.21, 65.265, 65.285, 65.29; 903/908, 903/944, 903, 907, 906
See application file for complete search history.

(56) References Cited

U.S. PATENT DOCUMENTS

| 5,550,445 | A | * | 8/1996 | Nii ................................. 318/153 |
| 6,953,100 | B2 | | 10/2005 | Aberle et al. |
| 7,447,572 | B2 | * | 11/2008 | Fuse et al. ........................ 701/22 |
| 7,487,851 | B2 | * | 2/2009 | Buck et al. ............... 180/65.265 |
| 7,682,719 | B2 | * | 3/2010 | Lienkamp et al. ............ 429/483 |
| 2002/0038732 | A1 | * | 4/2002 | Sugiura et al. ............... 180/65.2 |
| 2002/0095247 | A1 | * | 7/2002 | Ding et al. ........................ 701/22 |
| 2006/0102397 | A1 | | 5/2006 | Buck et al. |
| 2006/0278450 | A1 | * | 12/2006 | Shirasaka et al. ............ 180/65.3 |

FOREIGN PATENT DOCUMENTS

DE    10223117 A1    12/2003

(Continued)

OTHER PUBLICATIONS

Japanese Office Action for Application No. 2007-131876, dated May 7, 2009.

(Continued)

*Primary Examiner* — J. Allen Shriver, II
*Assistant Examiner* — Chiedu Chibogu
(74) *Attorney, Agent, or Firm* — Nelson Mullins Riley & Scarborough LLP; Anthony A. Laurentano

(57) ABSTRACT

A fuel cell vehicle is provided that can suppress uneven torque. The fuel cell vehicle 1 includes a motor 4; a fuel cell 10; a battery 3; a battery drive unit 21 for driving the motor 4 using electricity from the battery 3 so as to serve as an battery drive mode, in which case the initialization of the fuel cell 10 to generate electricity is not complete; a fuel cell drive unit 22 for driving the motor 4 using electricity from the fuel cell 10 and battery 3 so as to serve as a fuel cell drive mode, in which case the initialization of the fuel cell 10 to generate electricity is complete; and a torque upper limit control unit 23 for controlling a torque upper limit value of the motor 4 under the battery drive mode and fuel cell drive mode.

6 Claims, 5 Drawing Sheets

FOREIGN PATENT DOCUMENTS

| | | |
|---|---|---|
| DE | 10233821 A1 | 2/2004 |
| EP | 1575112 A2 | 9/2005 |
| JP | 2005-073475 A | 3/2005 |
| JP | 2006-353033 | 12/2006 |
| JP | 2007-74817 | 3/2007 |

OTHER PUBLICATIONS

European Office Action for Application No. 08008784.4, dated Sep. 19, 2008.

* cited by examiner

FUEL CELL VEHICLE

This application is based on and claims the benefit of priority from Japanese Patent Application No. 2007-131876, filed on 17 May 2007, the content of which is incorporated herein by reference.

BACKGROUND OF THE INVENTION

1. Field of the Invention

The present invention relates to a fuel cell vehicle. More specifically, the present invention relates to the fuel cell vehicle driven by electricity generated by a fuel cell.

2. Related Art

Recently, fuel cells have received focus as a new source of power for automobiles. A fuel cell vehicle with a fuel cell mounted thereto, for example, includes a fuel cell for generating electricity by a chemical reaction of reactant gas, a reactant gas supply device for supplying the reactant gas to the fuel cell via reactant gas lines, a motor for driving wheels by way of electricity generated by a fuel cell system, and a control device for control thereof.

The fuel cell, for example, has a stacked structure in which several tens to hundreds of cells are laminated. Each cell is configured by sandwiching a membrane electrode assembly (MEA) by a pair of plates. The membrane electrode assembly is configured by an anode and a cathode and a polymer electrolyte membrane which is arranged between the two electrodes.

As reactant gas, hydrogen gas and oxygen-containing air are supplied to the anode and cathode, respectively, of the fuel cell, thereby generating electricity by an electrochemical reaction.

In the fuel cell vehicle above, the motor is driven directly by electricity generated by the fuel cell, while storing electricity generated by the fuel cell into a power storage device such as a battery or a condenser, in order to drive the motor by using electricity of the power storage device when the fuel cell cannot generate electricity.

Incidentally, it would take time for such a fuel cell vehicle to start generating electricity from the fuel cell after ignition is turned ON. Due to this, the motor is driven by electricity from the power storage device until initialization of the fuel cell to generate electricity is complete, and after completion of the initialization of the fuel cell to generate electricity, the motor is driven by using electricity generated by the fuel cell.

For example, Japanese Unexamined Patent Application Publication No. 2005-73475 discloses a method for setting an upper limit value to an output of the power storage device, so that torque necessary to drive the motor by using electricity from the power storage device is ensured.

Nevertheless, since the fuel cell vehicle as described above controls only the output of power storage device, in a case where the electricity supply source is switched from the power storage device to the fuel cell, while an accelerator aggressively depressed, a sense of uneven torque may occur.

FIG. 5 is a timing chart of a fuel cell vehicle of the related art.

At time t0, the ignition is turned ON, battery initiation is prepared during time t0 to t1, and electricity can be supplied from the battery to the motor at time t1. Thus, after time t1, electricity that can be supplied to the motor is electricity supplied in the battery, which becomes constant at a predetermined value A.

Afterwards, at time t2, the driver presses the accelerator pedal, and the accelerator position is maintained at a maximum after time t2.

Then, during time t2 to t3, which is a startup time of the motor, rotation speed and power consumption of the motor increase and torque also increases rapidly. Afterwards, the power consumption of motor reaches the predetermined value A and becomes constant, the rotation speed of motor also increases to a certain extent, and the torque gradually decreases.

Continuing, the initialization of the fuel cell to generate electricity is complete, and at time t3, electricity generation of the fuel cell begins. Then, the electricity that can be supplied to the motor increases rapidly to a predetermined value B, and afterwards becomes constant.

Therefore, the rotation speed and the power consumption of the motor increase once again, and the torque also increases rapidly. Afterwards, the power consumption of the motor reaches the predetermined value B and becomes constant, the rotation speed of motor also increases to a certain extent, and the torque gradually decreases.

In the above way, at time t3, the torque, which gradually decreased until reaching time t3, increases rapidly, and a sense of uneven torque may occur when the electricity supply source switches from the power storage device to the fuel cell.

SUMMARY OF THE INVENTION

The present invention aims to provide a fuel cell vehicle that can suppress the sense of uneven torque, even when the electricity supply source is switched from the power storage device to the fuel cell.

A fuel cell vehicle (for example, a fuel cell vehicle 1 as described later) of the present invention includes: a motor (for example, a motor 4 as described later) for driving wheels; a fuel cell (for example, a fuel cell 10 as described later) for generating electricity by way of a reaction of reactant gas, and supplying the electricity to the motor; a power storage device (for example, a battery 3 as described later) for storing the electricity generated by the fuel cell, and supplying the electricity to the motor; a power storage device drive means (for example, a battery drive unit 21 as described later) r for driving the motor using the electricity from the power storage device so as to serve as a power storage device drive mode, in a case of driving in a state where the initialization of the fuel cell to generate electricity has not been completed; a fuel cell drive means (for example, a fuel cell drive unit 22 as described later) for driving the motor using the electricity from the fuel cell and the power storage device so as to serve as a fuel cell drive mode, in a case of driving in a state where the initialization of the fuel cell to generate electricity has been completed; and a torque upper limit value control means (for example, a torque upper limit value control unit 23 as described later) for controlling a torque upper limit value of the motor under the power storage device drive mode and the fuel cell drive mode; and in which the torque upper limit value control means restricts the torque upper limit value of the motor to be greater for the power storage device drive mode than that of the fuel cell drive mode.

According to this invention, the torque upper limit value of the motor under the power storage device drive mode is restricted to be greater than the torque upper limit value of the motor under the fuel cell drive mode. Therefore, a sense of uneven torque occurring under the state of aggressively depressing the accelerator can be suppressed, even in a case where the electricity supply source has been switched from the power storage device to the fuel cell. As a result, driving of the vehicle becomes smooth and product quality is improved.

In this case, it is preferable for the torque upper limit control means to gradually release a restriction imposed on the torque upper limit value after switching from the power storage device drive mode to the fuel cell drive mode.

According to this invention, the restriction that has been imposed on the torque upper limit value is gradually released after switching from the power storage device drive mode to the fuel cell drive mode. Therefore, an increase in the torque upper limit value after switching from the power storage device drive mode to the fuel cell drive mode is prevented, and furthermore, a sense of uneven torque is suppressed.

According to the present invention, the torque upper limit value of the motor under the power storage device drive mode is restricted to be greater than the torque upper limit value of the motor under the fuel cell drive mode. Therefore, under the state of aggressively depressing the accelerator, a sense of uneven torque can be suppressed, even in a case where the electricity supply source has been switched from the power storage device to the fuel cell. As a result, driving of the vehicle becomes smooth and product quality is improved.

DETAILED DESCRIPTION OF THE INVENTION

Hereinafter, the embodiments of the present invention are described with reference to the drawings.

Figure 1:
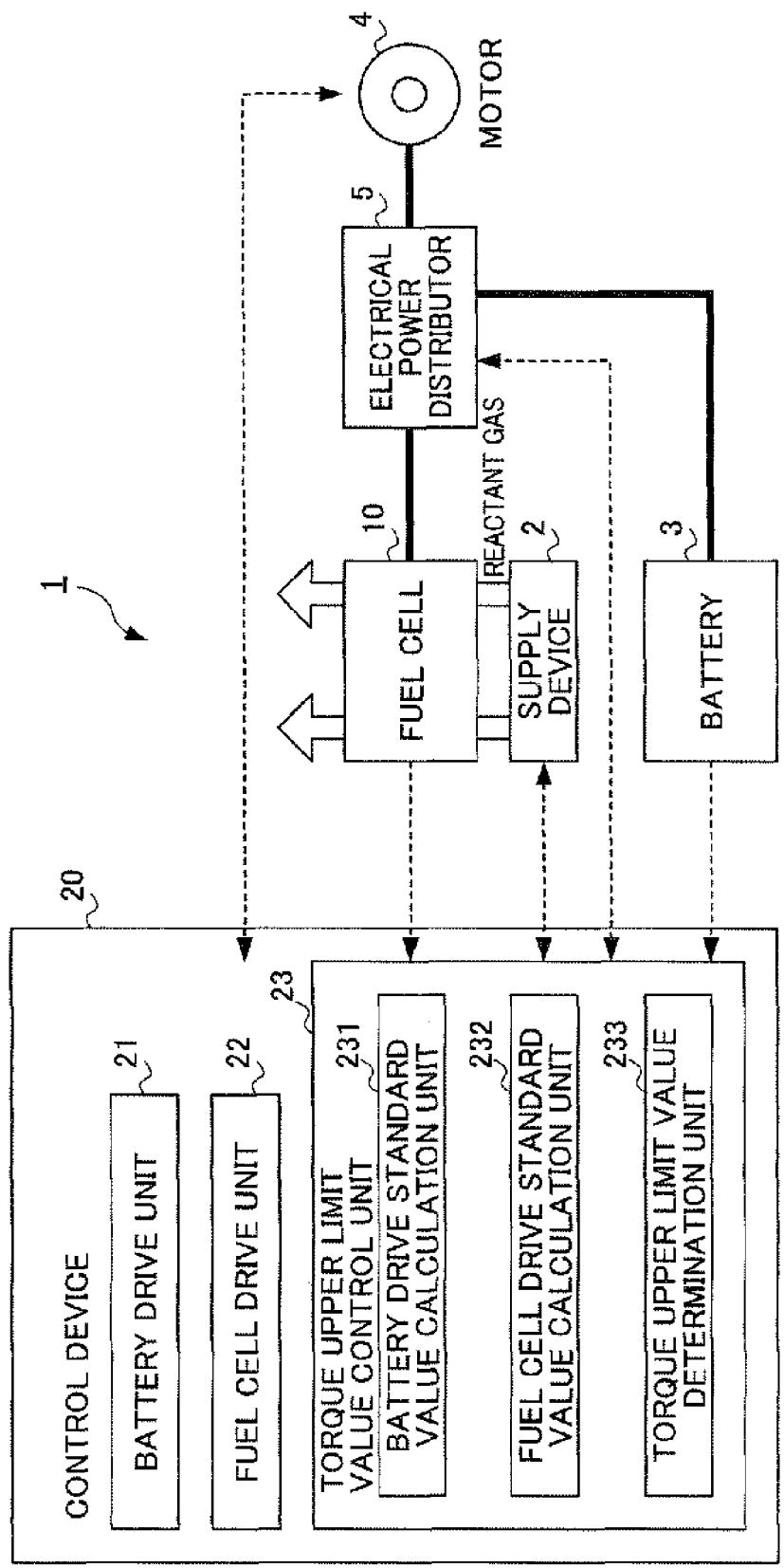
FIG. 1 illustrates a block diagram showing a configuration at the fuel cell vehicle according to an embodiment of the present invention.

FIG. 1 shows a block diagram of a fuel cell vehicle 1 in accordance with one embodiment of the present invention.

The fuel cell vehicle 1 includes a motor 4 for driving the wheels, a fuel cell 10 for generating electricity by way of a reaction of reactant gas, and supplying electricity to the motor 4, a supply device 2 for supplying hydrogen gas and air to the fuel cell 10, a battery 3 as a power storage device, for storing electricity generated by the fuel cell 10, and supplying electricity to the motor 4, and the control device 20 for control thereof.

Such a fuel cell 10 generates electricity by way of an electrochemical reaction when the hydrogen gas is supplied to an anode side and oxygen-containing air is supplied to a cathode side.

Although not illustrated in the drawings, the supply device 2 includes an air compressor, condenser, and humidifier that supply the air to the cathode side of the fuel cell 10, and a hydrogen tank and ejector that supply the hydrogen gas to the anode side.

The fuel cell 10 is connected to the battery 3 and motor 4 via an electrical power distributor 5. Electricity generated by the fuel cell 10 is supplied to the battery 3 and the motor 4. The electrical power distributor 5 distributes output from the fuel cell 10 as required, and supplies to the motor 4 and the battery 3.

The battery 3 stores electricity generated by the fuel cell 10 for supplying electricity to the motor 4 when electricity generation of the fuel cell 10 has stopped or when output voltage of the fuel cell 10 declines.

The fuel cell 10, the supply device 2, the battery 3, the motor 4, and the electrical power distributor 5 are connected to the control device 20.

The control device 20 includes a battery drive unit 21 serving as a power storage device drive means, a fuel cell drive unit 22 serving as a fuel cell drive means, and a torque upper limit value control unit 23 serving as a torque upper limit value control means.

The battery drive unit 21 drives the motor 4 by using electricity from the battery 3 in a case where driving under the state in which the initialization of the fuel cell 10 to generate electricity has not been completed, which is considered to be a battery drive mode, which is referred to as the power storage device drive mode.

The fuel cell drive unit 22 drives the motor 4 by using electricity from the fuel cell 10 in a case where driving under the state in which the initialization of the fuel cell 10 to generate electricity has been completed, which is considered to be the fuel cell drive mode.

The torque upper limit value control unit 23 controls a torque upper limit value of the motor 4 under the battery drive mode and the fuel cell drive mode. If a targeted torque value dependent on the accelerator position is of greater than a torque upper limit value, then the torque of the motor 4 is set as the target torque value. On the other hand, if a target torque value exceeds the torque upper limit value, then the torque of the motor 4 is set as the torque upper limit value.

The torque upper limit value control unit 23 includes a battery drive standard value calculation unit 231, a fuel cell drive standard value calculation unit 232, and a torque upper limit value determination unit 233.

The battery drive standard value calculation unit 231 calculates a torque upper limit standard value in the battery drive mode, by using the rotation speed of the motor.

The fuel cell drive standard value calculation unit 232 calculates the torque upper limit standard value in the fuel cell drive mode, by using the rotation speed of the motor.

Figure 2:
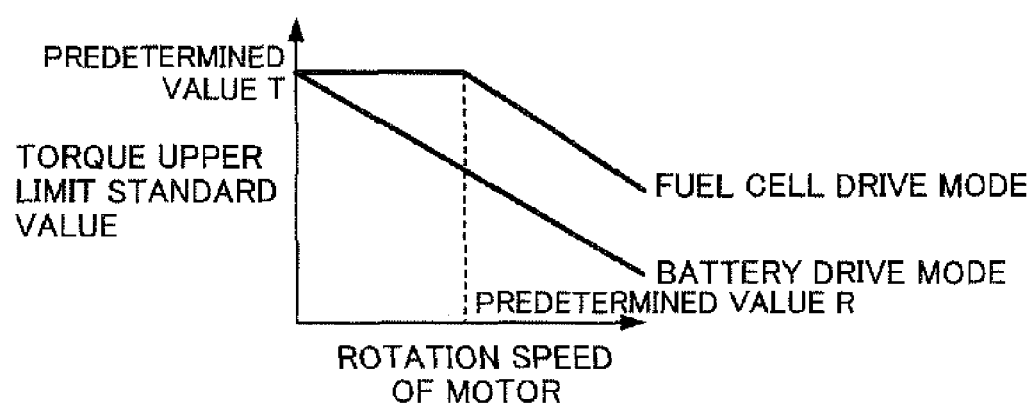
FIG. 2 shows a relationship of the rotation speed of the motor and torque upper limit standard value according to the embodiment.

FIG. 2 is a drawing showing a relationship between the rotation speed of the motor and the torque upper limit standard value.

Under the battery drive mode, the torque upper limit standard value declines as the rotation speed of the motor increases.

Under the fuel cell drive mode, even if the rotation speed of the motor increases, the torque upper limit standard value remains constant at a predetermined value T until the rotation speed of the motor reaches a predetermined value R, starting from zero. However, the torque upper limit standard value decreases accompanied by an increase in the rotation speed of the motor greater than the predetermined value R.

The torque upper limit value determination unit 233 restricts the torque upper limit value of the motor 4 in the battery drive mode to be greater than that of the fuel cell drive mode. That is, while initializing the fuel cell 10 to generate electricity, the motor 4 is driven by way of electricity from the battery 3. In this case, a target torque (power consumption) is restricted to a greater extent compared to the case where the motor 4 is driven using electricity from the fuel cell 10, when manipulated in the same way by a driver.

More specifically, operation of the battery drive mode is described.

Under the battery drive mode, electricity that can be used by the motor 4 is determined based on features such as the remaining amount and output limit of the battery 3, output limit of DC/DC converter, and power consumption of auxiliary devices.

The torque upper value becomes a maximum when the motor 4 utilizes all usable electricity. However, under the battery drive mode, the torque upper limit standard value is set to be lower than the maximum torque upper value, and this torque upper limit standard value is taken as the torque upper limit value. The torque upper limit value is restricted accordingly.

As described above, in the present embodiment, the torque upper limit standard value is calculated based on the rotation speed of the motor, however, it is not limited to above but it may be calculated based on a battery drive time or time remaining until completing startup of the fuel cell.

Operation of the fuel cell drive mode is described next.

Under the fuel cell drive mode, electricity usable by the motor 4 is determined based on features such as electricity generation capacity and output limit of the fuel cell 10, output limit of DC/DC converter, and power consumption of the auxiliary devices.

During battery driving, the torque upper limit value is restricted; however, after switching to fuel cell driving, the restriction that had been added to the torque upper limit value is gradually released, the torque upper limit value is gradually increased, and the original torque upper limit value is approached.

That is, during the battery driving, the torque upper limit standard value in the battery drive mode is also calculated based on the rotation speed of the motor. The torque upper limit standard value in the fuel cell drive mode is calculated based on the rotation speed of the motor, even after switching to fuel cell driving. Then, a factor that interpolates the torque upper limit standard value in the battery drive mode and the torque upper limit standard value in the fuel cell drive mode is set, and this factor is changed so that a torque upper limit value approaches from the torque upper limit standard value in the battery drive mode to the torque upper limit standard value in the fuel cell drive mode.

The torque upper limit value may be gradually increased by a fixed amount of change after switching to the fuel cell drive mode, or it may gradually be increased by an amount of change calculated by the time after switching to fuel cell driving; alternatively, it may gradually be increased by an amount of change calculated by using the rotation speed of the motor.

Figure 3:
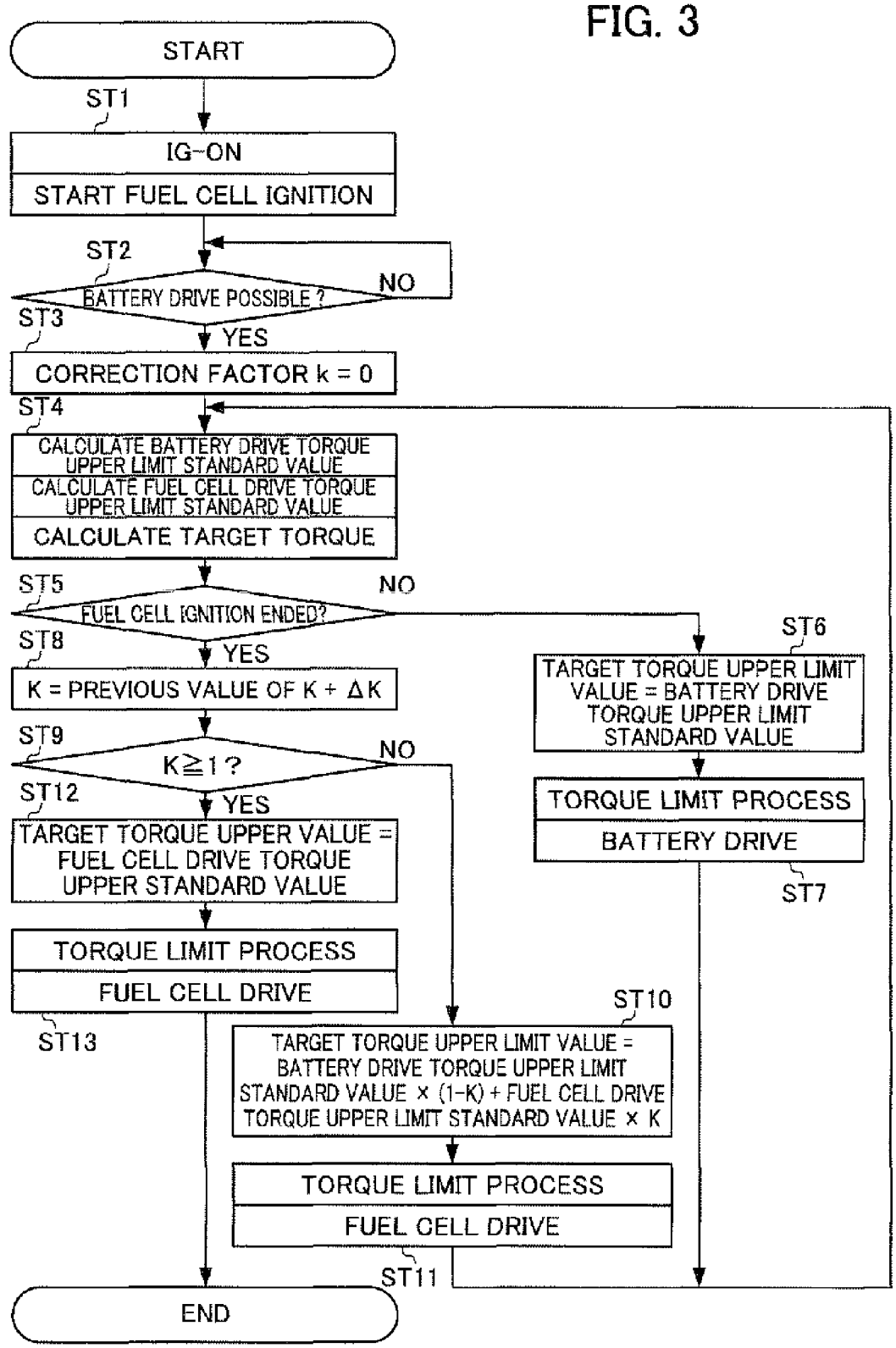
FIG. 3 is a flow chart indicating operation of the fuel cell vehicle according to the embodiment.

Operation of the fuel cell vehicle 1 is described with reference to the flow chart of FIG. 3.

At first, the ignition is turned ON, and initiation of the fuel cell 10 starts in ST1.

Subsequently, in ST2, an initiation mode of the battery is checked in order to determine whether or not battery driving is possible. In a case where this determination is NO, the process returns to ST2, and in a case where it is YES, the processing moves to ST3 since battery driving is possible.

In ST3, a correction factor K is set to zero.

In ST4, the torque upper limit standard value in the battery drive mode and the torque upper limit standard value in the fuel cell drive mode are calculated. Furthermore, a target torque, which is a target of motor output dependent on the accelerator position, is calculated.

In ST5, the process determines whether or not the initiation of the fuel cell has been completed. In a case where this determination is NO, which indicates the battery drive mode, and a restriction is imposed on the torque upper limit value, and the target torque upper limit value is taken as the torque upper limit standard value in the battery drive mode in ST6. Afterwards, in ST7, torque limit processing is performed, and battery driving is performed.

In case where the determination of ST5 is YES, which indicates the fuel cell drive mode, the correction factor K is increased by ΔK in ST7.

Subsequently, in S39, the processing determines whether or not this correction factor K is at least 1. In a case where this determination is NO, the restriction imposed on the torque upper limit value is further released in ST10. More specifically, a target torque upper limit value is calculated according to the equation below, based on a value of the correction factor K.

Target torque upper limit value fuel cell drive torque upper limit standard value×K+battery drive torque upper limit standard value×(1−K)

Afterwards, in ST11, the torque limit processing is performed, and fuel cell driving is performed.

In a case where the determination of ST9 is YES, the restriction imposed on the torque upper limit value is completely released, and the torque upper limit value has reached the torque upper limit standard value in the fuel cell drive mode; therefore, the target torque upper limit value is taken as the torque upper limit standard value in the fuel cell drive mode in ST12. Afterwards, in ST13, torque limit processing is performed, and fuel cell driving is performed.

Figure 4:
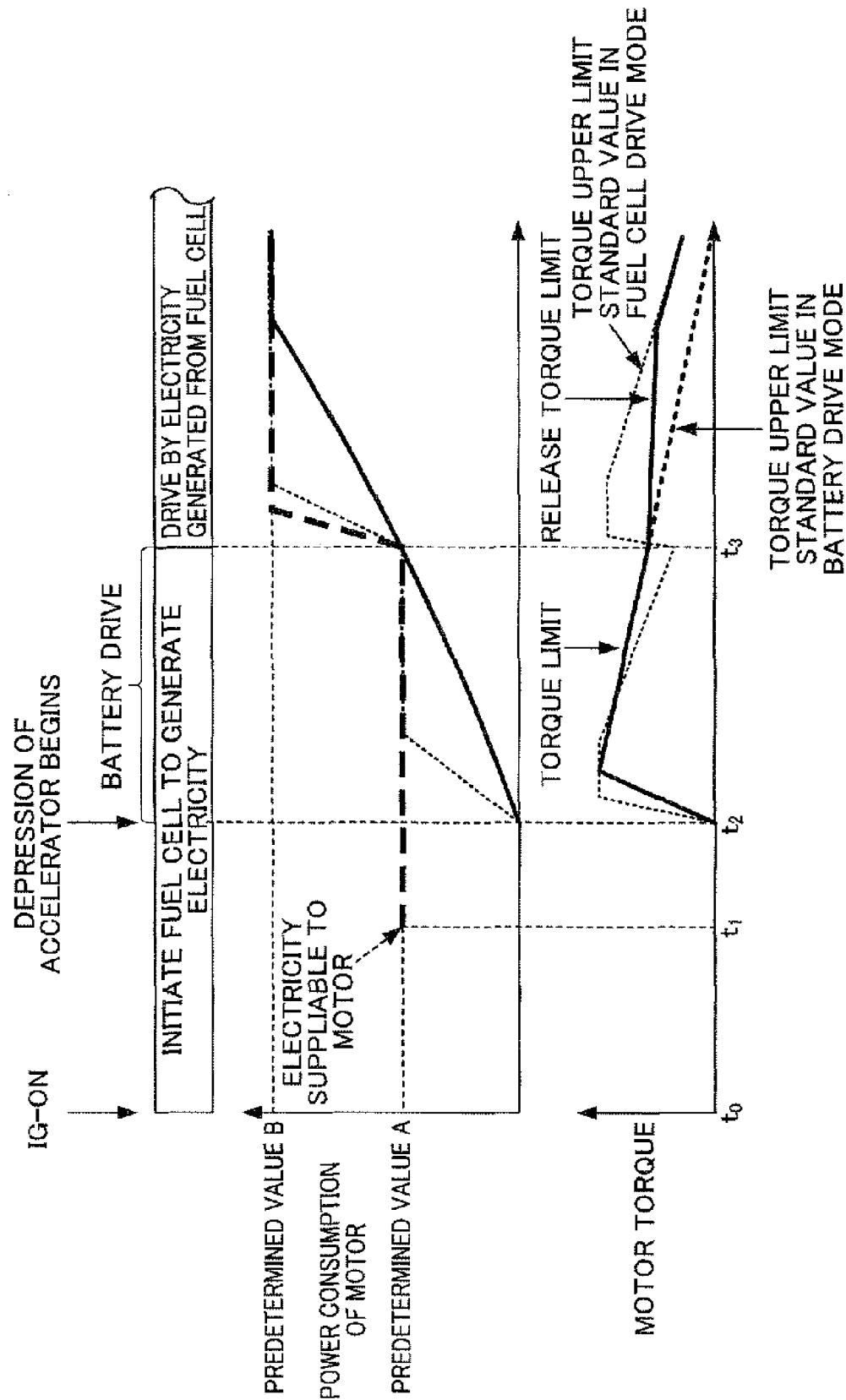
FIG. 4 is a timing chart of the fuel cell vehicle according to the embodiment.
Figure 5:
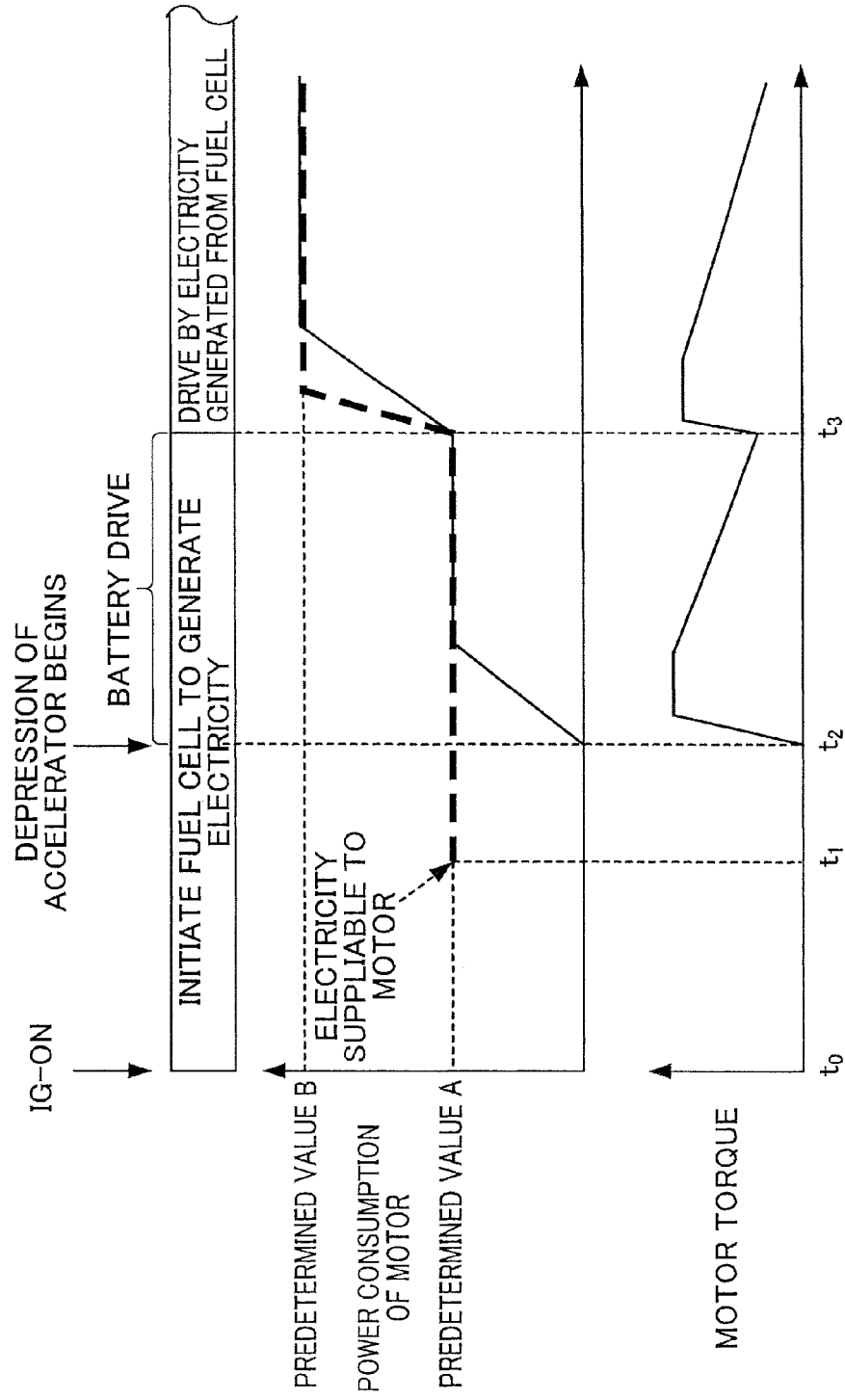
FIG. 5 is a timing chart for the fuel cell vehicle according to the prior art of the present invention.

FIG. 4 is a timing chart of the fuel cell vehicle 1.

The ignition is turned ON at time t0, battery initiation is prepared during time t0 to t1, and electricity is supplied from the battery to the motor at time t1. Therefore, after time t1, electricity that can be supplied to the motor is electricity stored in the battery, which becomes constant at a predetermined value A.

Afterwards, at time t2, a driver presses on the accelerator pedal, and after time t2, the accelerator position is maintained at a maximum.

Then, during time t2 to t3, the torque upper limit value is restricted, and the torque upper limit value is equal to the torque upper limit standard value in the battery drive mode.

Therefore, when compared to the conventional way, the rotation speed and power consumption of the motor 4 increase smoothly, and the torque also increases smoothly, even during the initiation time of the motor 4. Afterwards, the rotation speed of the motor increases to a certain extent and the torque declines; however, the decrease in torque is smooth compared to the conventional way.

Continuing, electricity generation preparation of the fuel cell 10 is completed, and electricity generation of the fuel cell 10 starts at time t3. Then, the electricity that can be supplied to the motor 4 increases rapidly up to a predetermined value B, and becomes constant thereafter.

Then, the restriction imposed on the torque upper limit value is gradually released, and the rotation speed and power consumption of the motor continue to increase smoothly compared to the conventional way, and the power consumption of motor reaches the predetermined value B. On the other hand, the torque further decreases smoothly in comparison to before time t3, and approaches the original torque upper limit value. That is, the torque upper limit value gradually moves from the torque upper limit standard value in the battery drive mode to the torque upper limit standard value in the fuel cell drive mode.

The present embodiment has the following effects.

(1) The torque upper limit value of the motor 4 in the battery drive mode is restricted to be greater than that of the fuel cell drive mode. Thus, a sense of uneven torque is suppressed, even if the electricity supply source has been switched from the battery 3 to the fuel cell 10, while the accelerator is aggressively depressed. As a result of this, movement of the vehicle becomes smooth, and product quality is improved.

(2) The restriction imposed on the torque upper limit value is gradually released after switching from the battery drive mode to the fuel cell drive mode. Thus, the torque upper limit value is prevented from increasing immediately after switching from the battery drive mode to the fuel cell drive mode, and furthermore, a sense of uneven torque can be suppressed.

The present invention is not limited by the embodiment described herein, and modifications and improvements are intended to be within the scope of this invention.

For example, in the present embodiment, the battery 3 is used as a power storage device. However, a capacitor may be used in place thereof.

Moreover, in the present embodiment, the torque upper limit value is restricted; a target torque dependent on the accelerator position may be restricted instead, as shown by the following two methods.

That is, according to the first method, in the battery drive mode, the target torque value dependent on the accelerator position is obtained by using a first torque calculation map. In the fuel cell drive mode, a target torque value dependent on the accelerator position is obtained by using a second torque calculation map. A target torque obtained by the first torque calculation map is set to be smaller than a target torque obtained by the second torque calculation map, although the accelerator position is the same.

Then, after switching to fuel cell driving, a factor that interpolates the target torque value obtained by the first torque calculation map and the target torque value obtained by the second torque calculation map is set. This factor is changed so that a target torque value approaches from the target torque value obtained by the first torque calculation map to the target torque value obtained by the second torque calculation map.

Moreover, according to the second method, the same torque calculation map is used for the battery drive mode and fuel cell drive mode to obtain the target torque value dependent on the accelerator position. In the battery drive mode, the correction factor is multiplied by the obtained target torque value to get the target torque value. After switching to fuel cell driving, the target torque value that multiplied the correction factor is further multiplied by a factor, and this factor is gradually increased so that the target torque value approaches from the target torque value having multiplied the correction factor to the target torque value without having multiplied the correction factor.

What is claimed is:

1. A fuel cell vehicle, comprising:
   a motor for driving wheels;
   a fuel cell for generating electricity by way of a reaction of reactant gas, and supplying the electricity to the motor;
   a power storage device for storing the electricity generated by the fuel cell, and supplying the electricity to the motor;
   a power storage device drive means, for driving the motor using the electricity from the power storage device so as to serve as a power storage device drive mode, in a case of driving in a state in which initialization of the fuel cell to generate electricity has not been completed;
   a fuel cell drive means, for driving the motor using the electricity from the fuel cell and the power storage device so as to serve as a fuel cell drive mode, in a case of driving in a state in which the initialization of the fuel cell to generate electricity has been completed; and
   a target torque control means for controlling a target torque of the motor in the power storage device drive mode and fuel cell drive mode,
   wherein the target torque control means determines first and second target torque values of the motor for the power storage device drive mode and the fuel cell drive mode, respectively, and imposes a greater restriction on the target torque of the motor for the power storage device mode than the fuel cell drive mode,
   wherein the target torque control means calculates the first target torque value to be applied to the power storage device drive mode in accordance with a number of rotation of the motor,
   wherein the target torque control means gradually releases the restriction imposed on the target torque after switching from the power storage device drive mode to the fuel cell drive mode, such that the target torque of the motor gradually approaches the second target torque value applied to the fuel cell drive mode, starting from the first target torque value of the power storage device drive mode at a time of the switching,
   wherein the motor is powered by the electricity from the power storage device in the power storage device drive mode and by the electricity from the fuel cell in the fuel cell drive mode.

2. The fuel cell vehicle according to claim 1, wherein the power storage device is a battery.

3. The fuel cell vehicle according to claim 1, wherein the target torque control means obtains a target torque value dependent on an accelerator position by using a first torque calculation map in the power storage device drive mode, and a target torque value dependent on the accelerator position by using a second torque calculation map in the fuel cell drive mode, and the target torque value obtained from the first torque calculation map is smaller than the target torque value obtained from the second torque calculation map, for a predetermined accelerator position.

4. The fuel cell vehicle according to claim 1, wherein the target torque control means obtains a target torque value dependent on an accelerator position, by using a torque calculation map in the fuel cell drive mode, and a target torque value dependent on the accelerator position, by using the torque calculation map in the power storage device drive mode, and further, takes a value obtained by multiplying the obtained torque value by a correction factor as the target torque value.

5. A control method of a fuel cell vehicle comprising:
   a motor for driving wheels;
   a fuel cell for generating electricity by way of a reaction of reactant gas, and supplying the electricity to the motor; and
   a power storage device for storing the electricity generated by the fuel cell, and supplying the electricity to the motor, the method comprising the steps of:
   setting a power storage device drive mode by driving the motor using the electricity from the power storage device, in a case of driving in a state in which initiation of the fuel cell to generate electricity has not been completed;
   setting a fuel cell drive mode by driving the motor using the electricity from the fuel cell and the power storage device, in a case of driving in a state in which the initiation of the fuel cell to generate electricity has been completed;

calculating a first torque upper limit value to be applied to the power storage device drive mode in accordance with a number of rotation of the motor;

imposing a restriction on a torque upper limit value of the motor so that the torque upper limit value in the power storage device drive mode is greater than the torque upper limit value in the fuel cell drive mode; and gradually releasing the restriction imposed on the torque upper limit value of the motor after switching from the power storage device drive mode to the fuel cell drive mode, such that the torque upper limit value of the motor gradually approaches a second torque upper limit value applied to the fuel cell drive mode, starting from the first torque upper limit value applied to the power storage device drive mode at a time of the switching.

6. The fuel cell vehicle according to claim 1, wherein the target torque control means restricts the first target torque value of the motor to be greater in the power storage device drive mode than the second target torque value of the motor in the fuel cell drive mode.

* * * * *